T. DAVIES.

FURNACES FOR LOCOMOTIVES.

No. 7,050. Reissued April 11, 1876.

WITNESSES

E. S. Cottingham

F. O. McCleary

INVENTOR

Thomas Davies,

By Leggett and Leggett

Attorneys

N. PETERS, PHOTO-LITHOGRAPHER, WASHINGTON, D. C.

UNITED STATES PATENT OFFICE.

THOMAS DAVIES, OF CLEVELAND, OHIO, ASSIGNOR TO DAVID S. CRITCHLEY.

IMPROVEMENT IN FURNACES FOR LOCOMOTIVES.

Specification forming part of Letters Patent No. 134,422, dated December 31, 1872; reissue No. 7,050, dated April 11, 1876; application filed March 15, 1876.

*To all whom it may concern:*

Be it known that I, THOMAS DAVIES, of Cleveland, in the county of Cuyahoga and State of Ohio, have invented a new and useful Improvement in Locomotive-Boiler Furnaces, of which the following is a specification:

This invention relates to a new and useful improvement in the furnaces of locomotive steam-boilers; and consists in the means employed for supplying atmospheric air to the fire-box, hereinafter more fully set forth and described.

Figure 1:
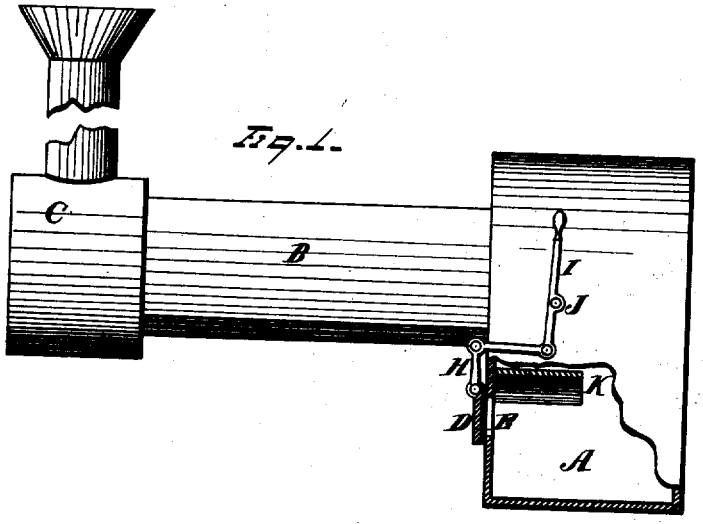
Figure 2:
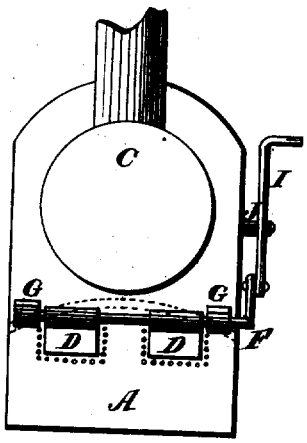

In the accompanying drawing, Figure 1 is a side elevation of a locomotive-boiler with a part of the fire-box broken away, and Fig. 2 is a front-end view of the same.

Similar letters of reference indicate corresponding parts.

A represents the fire-box. B is the tube-section. C is the smoke-box. D D represent doors or valves which close orifices E in the front of the fire-box. There may be one or more of these orifices E, through which atmospheric air may enter the fire-box for supporting combustion. These valves or doors are fastened to the horizontal shaft F, so that by partially revolving the shaft the doors or valves will be opened or partially opened, as may be desired.

The shaft works in boxes or journals G G, and one end thereof, H, is turned at a right angle, forming a crank, to which is attached the lever I, whose fulcrum is at J, by means of which the doors or valves are adjusted in any desired position.

K represents an arch, made of fire-brick or any other material which will withstand a high temperature. This arch extends across the front of the fire-box, as indicated in dotted lines in Fig. 2, and extends back toward the fire-door one-half (more or less) the depth of the fire-box, the crown of the arch being just beneath the tube-section.

The arch extends in a horizontal direction from the front wall of the fire-box toward the furnace-door, and serves as a deflector to distribute the incoming air over and above every portion of the bed of fuel, whereby highly-heated air is furnished to the locomotive when at rest, and any damage to the tube-sheet thereby obviated.

The doors or apertures E (one or more) are placed just below the arch. This arch confines the admitted air and forces it to mingle with the smoke and gaseous products of combustion.

When a locomotive-boiler is in motion, strong currents of air may be introduced into the fire-box by opening the doors D D. These currents will enter above the fuel and mingle with the smoke and gaseous products of combustion.

The carbonic oxide generated by the fuel will thus be furnished with an additional supply of oxygen, and be consumed with the smoke. The quantity of air thus admitted will depend upon the quality of the coal used—some kinds requiring more air than others.

The fireman will adjust the doors or valves according to circumstances.

By a proper adjustment the requisite quantity of air may be admitted to consume all the fuel, and not allow a portion to escape from the chimney in the form of smoke and combustible gases. The result is a great saving of fuel, and an abatement of the smoke nuisance.

Having thus described my invention, I claim as new and desire to secure by Letters Patent—

1. The combination, with a locomotive fire-box, of a horizontal arch or deflector, K, and openings E E, located beneath said arch and in the front wall of the fire-box, substantially as and for the purpose specified.

2. The combination, with a locomotive fire-box, provided with a horizontal arch or deflector, K, of the openings E E, located in the front of the fire-box, as described, and valves for regulating the supply of air through said openings, substantially as and for the purpose set forth.

3. The combination, with a locomotive-boiler, of a fire-box, provided with openings E E in its front wall, and valves D D, and a lever-connection, whereby the fireman may, from the cab or rear end of the boiler, regulate the positions of the said valves, substantially as set forth.

4. The combination, with a fire-box, of openings E E in its front wall, and valves D D and mechanism F H I J, for operating said valve, substantially as and for the purposes described.

THOMAS DAVIES.

Witnesses:
FRANCIS TOUMEY,
JAMES P. WALSH.